Feb. 25, 1941. H. N. MAY 2,232,825
SEEDER
Filed July 28, 1939 3 Sheets-Sheet 3
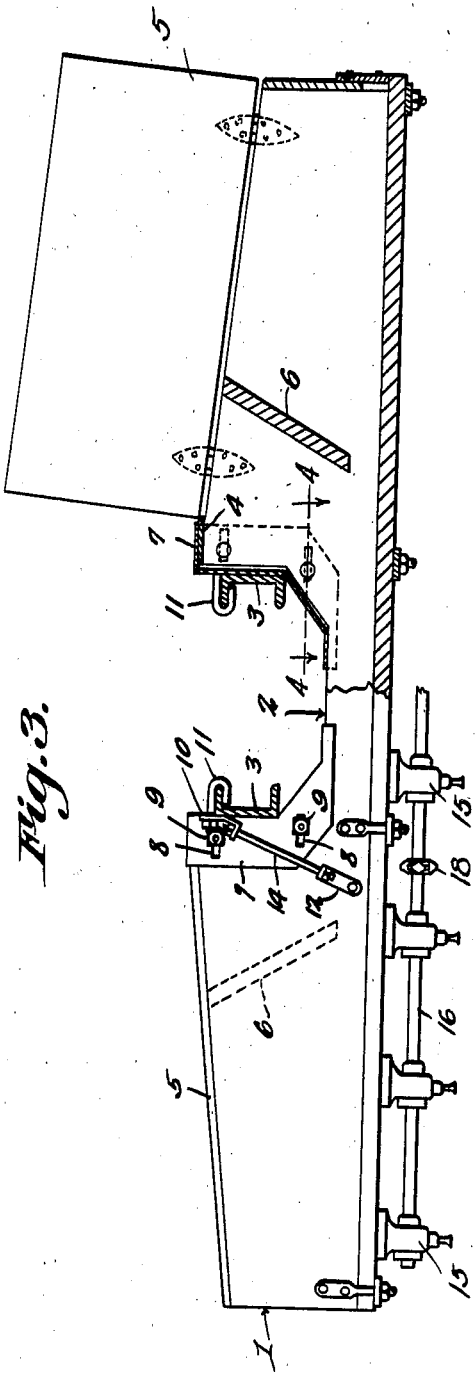
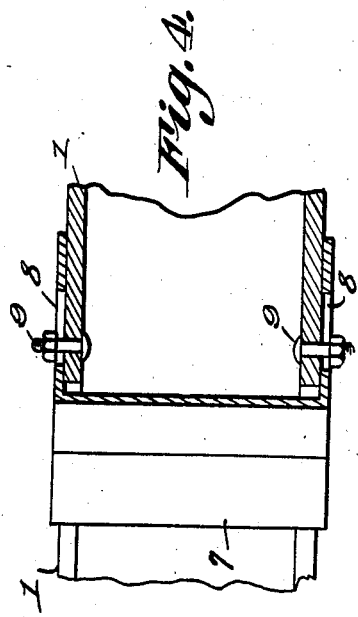
H. N. May
INVENTOR.
BY C. A. Knowles
ATTORNEYS.

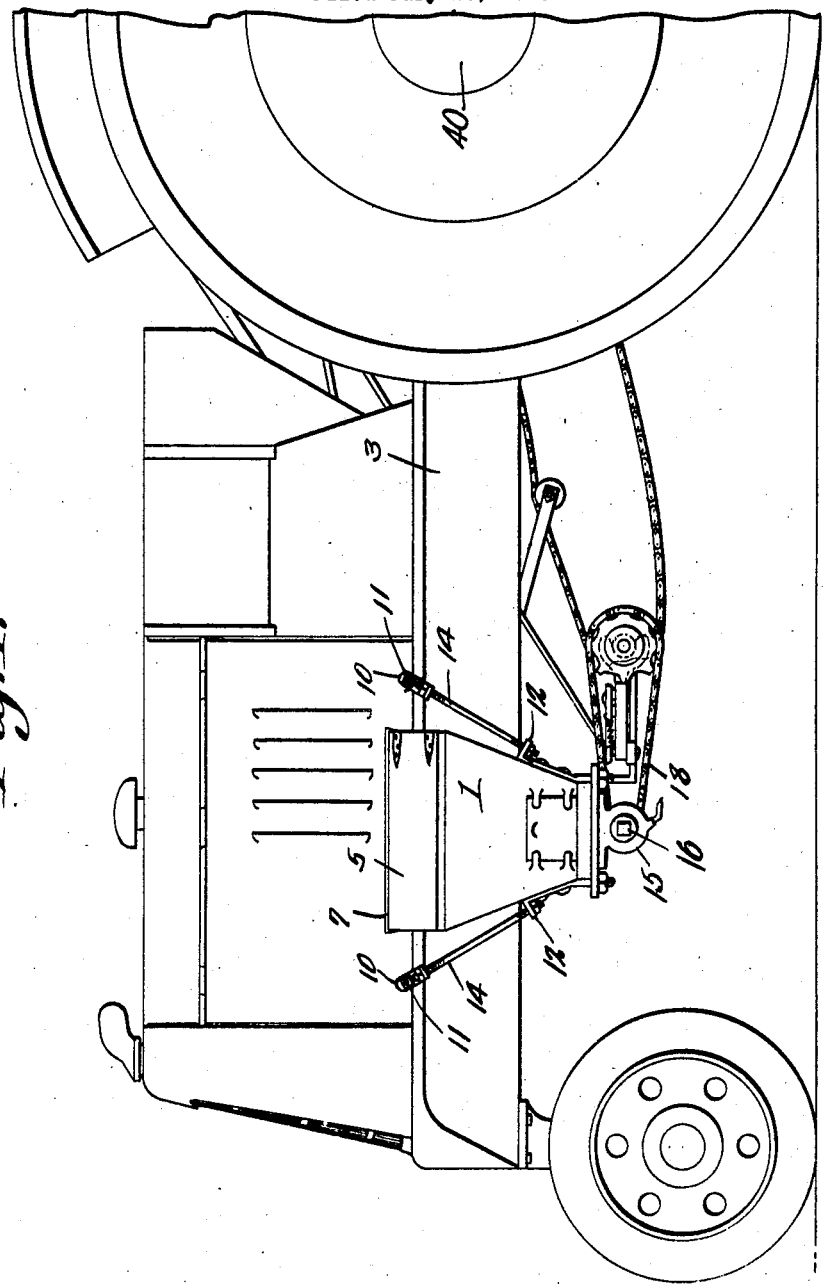

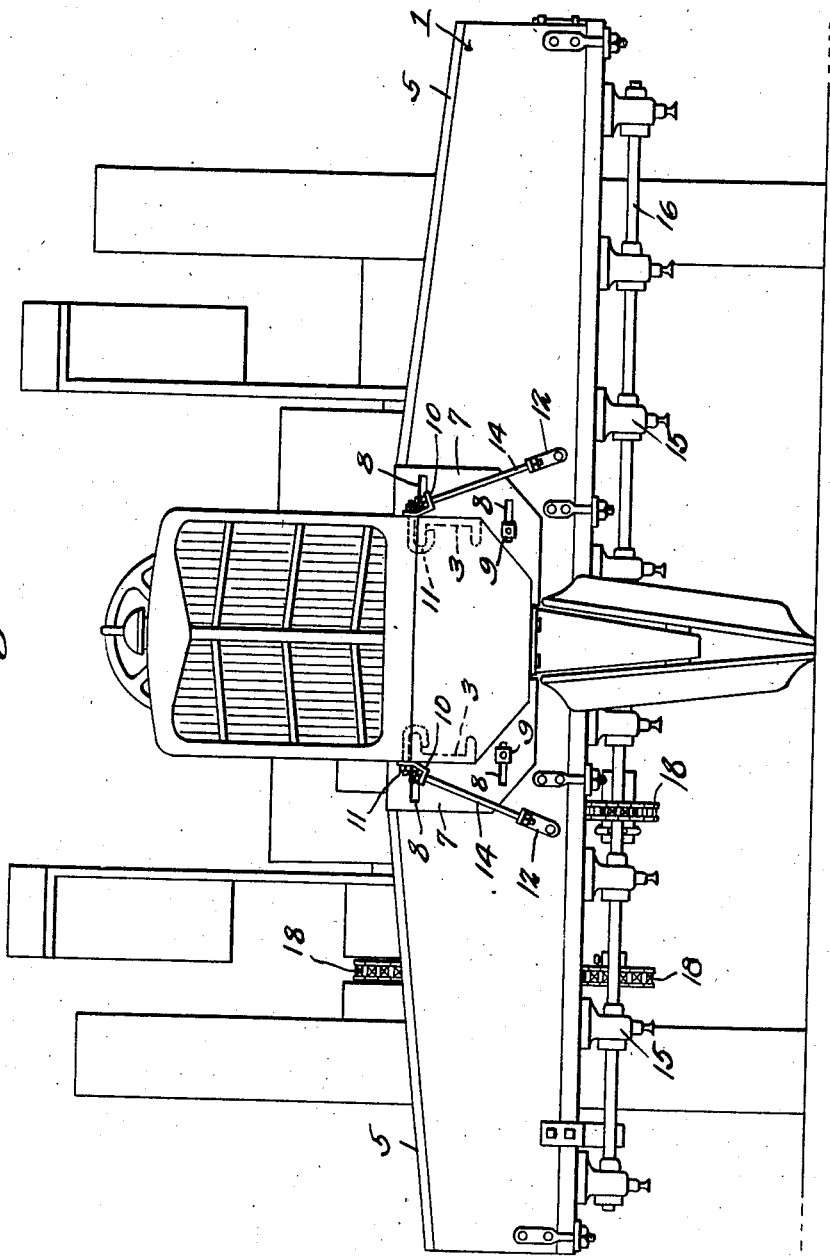

Patented Feb. 25, 1941

2,232,825

UNITED STATES PATENT OFFICE 2,232,825

SEEDER

Herman N. May, Mineral Point, Wis.

Application July 28, 1939, Serial No. 287,150

2 Claims. (Cl. 111—1)

This invention aims to provide a seeding mechanism, so constructed that it may be mounted on the frame bars of a tractor, provision being made whereby the device may be assembled with tractor frames of different widths.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in side elevation, a tractor equipped with the device forming the subject matter of this application;

Fig. 2 is a front elevation showing a tractor whereon the seeding mechanism is mounted;

Fig. 3 is a front elevation of the seed box, wherein parts are broken away;

Fig. 4 is a section on an enlarged scale on the line 4—4 of Fig. 3.

The invention comprises the combination with a tractor including a frame 3, of a seeder attachment, said attachment comprising a seed box 1, disposed transversely of the frame, and provided in its upper portion, and intermediate its end walls, with a downwardly-extended recess 2 receiving the frame, the recess being formed by partially cutting away the side walls of the box, thereby forming openings between the uncut portions of the side walls. The seed box 1 is provided, on opposite sides of the recess 2, with top strips 4. Lids 5 extend between the top strips 4 and the outer end walls of the seed box, the lids being hingedly mounted. Downwardly extended and inwardly inclined baffles 6 reach across the seed box 1, on opposite sides of the recess 2 and in the vicinity of the recess. The baffles 6 terminate short of the bottom of the seed box 1. The baffles 6 serve to prevent the seed in the box from working inward too rapidly, toward the central part of the recess 2, and, perhaps, finding an exit through the recess.

Closures 7 are located at the sides of the recess 2. The closures 7 extend over the top strips 4, to prevent leakage, and they extend, also, over the side walls of the seed box 1. It is desirable that the closures 7 can be moved in and out, in order to adapt the seed box to tractors, the beams 3 of which are spaced apart at different distances. With this end in view, the side walls of the closures 7 are provided with horizontal slots 8, receiving bolts 9, mounted in the walls of the seed box 1.

The closures 7 are held against the outer sides of the frame beams by hook bolts 11, engaged through brackets 10, bearing against the outer sides of the frame beams 3, the brackets being connected by downwardly converging (Fig. 1) and outwardly inclined (Fig. 3) draw bolts 14 with anchors 12 mounted on the walls of the seed box 1.

Seed distributors or depositors 15 are secured to the bottom of the seed box 1, and in the casings of the seed distributors, a main shaft 16 is journaled for rotation. The shaft 16 is rotated in any conventional or appropriate way, for instance by an operative connection 18 between the shaft 16 and the rear tractor axle 40.

The operation of the device will be understood readily from what has been stated hereinbefore, but by way of recapitulation, the closures 7 can be moved in and out, and be secured in place by the bolts 9, to adapt the seed box 1 to tractor frames of different widths, the closures being connected to the frame bars 3 by the hook bolts 11, and the seed box being held in place, further, by the brackets 10, the draw bolts 14 and the anchors 12.

The seed in the end portions of the box 1 moves inwardly, beneath the baffles 6, and passes to the seed distributors or broadcasters 15. The broadcasters are operated by the shaft 16. The shaft 16 derives its motion from the rear axle 40 of the tractor, through the mechanism indicated at 18.

The device forming the subject matter of this application is simple in construction, but it affords means whereby a seed box may be held transversely of, and upon, tractor frames of different widths, novel means being supplied for bringing about a distribution and spreading the seed.

It will be noted that the shape of the seed box provides increased capacity adjacent the recess 2 so that the box will empty uniformly throughout its entire length, the baffles 6 serving to retain sufficient seed to supply that portion of the seed box otherwise rendered deficient by reason of the recess 2.

Having thus described the invention, what is claimed is:

1. The combination with a tractor including a frame, of a seeder attachment, said attachment comprising a seed box disposed transversely of the frame and provided in its upper portion, and intermediate its end walls, with a downwardly-extended recess receiving the frame, the recess being formed by partially cutting away the side walls of the box, thereby forming openings between the uncut portions of the side walls, adjustable closures for the openings, means for mounting the closures on the box for in and out adjustment, to accommodate tractor frames of different widths, means for securing the box to the tractor frame, a seed depositor carried by the box, and means for operating the depositor.

2. The combination with a tractor including a frame, of a seeder attachment, said attachment comprising a seed box disposed transversely of the frame and provided in its upper portion, and intermediate its end walls, with a downwardly-extended recess receiving the frame, the recess being formed by partially cutting away the side walls of the box, thereby forming openings between the uncut portions of the side walls, adjustable closures for the openings, brackets, anchors on the seed box, draw connections assembled with the brackets and the anchors, connectors for joining the brackets with the frame of the tractor, means for mounting the closures on the box for in and out adjustment, to accommodate tractor frames of different widths, a seed depositor carried by the box, and means operating the depositor.

HERMAN N. MAY.